(12) United States Patent
Park et al.

(10) Patent No.: US 8,767,674 B2
(45) Date of Patent: Jul. 1, 2014

(54) METHOD FOR PERFORMING RRC CONNECTION OR REESTABLISHMENT IN A COMMUNICATION SYSTEM USING CARRIER AGGREGATION

(75) Inventors: Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 13/265,541

(22) PCT Filed: Apr. 15, 2010

(86) PCT No.: PCT/KR2010/002335
§ 371 (c)(1),
(2), (4) Date: Nov. 30, 2011

(87) PCT Pub. No.: WO2010/123224
PCT Pub. Date: Oct. 28, 2010

(65) Prior Publication Data
US 2012/0069819 A1    Mar. 22, 2012

Related U.S. Application Data

(60) Provisional application No. 61/171,440, filed on Apr. 21, 2009.

(30) Foreign Application Priority Data

Apr. 12, 2010 (KR) .................. 10-2010-0033274

(51) Int. Cl.
*H04W 4/00* (2009.01)
(52) U.S. Cl.
USPC ........................................................ 370/331

(58) Field of Classification Search
USPC .................................................. 370/312, 329
See application file for complete search history.

(56) References Cited

U.S. PATENT DOCUMENTS

| | | | |
|---|---|---|---|
| 6,795,412 B1 * | 9/2004 | Lee ............................... | 370/329 |
| 2006/0034204 A1 * | 2/2006 | Lee et al. .................... | 370/312 |
| 2010/0034163 A1 * | 2/2010 | Damnjanovic et al. ....... | 370/329 |
| 2011/0299489 A1 * | 12/2011 | Kim et al. .................... | 370/329 |

OTHER PUBLICATIONS

LG Electronics, "Initial Access Procedure in LTE-Advanced," R1-090210, 3GPP TSG RAN WG1 Meeting #55bis, Jan. 2009.
LG Electronics, "Initial Access Procedure in LTE-Advanced," R1-090779, 3GPP TSG RAN WG1 Meeting #56, Feb. 2009.
LG Electronics, "UE-specific Carrier Assignment for LTE-Advanced," R1-091207, 3GPP TSG RAN WG1 Meeting #56bis, Mar. 2009.

* cited by examiner

*Primary Examiner* — Yemane Mesfin
*Assistant Examiner* — Derrick V Rose
(74) *Attorney, Agent, or Firm* — Lee, Hong, Degerman, Kang & Waimey (57) ABSTRACT

The invention relates to a method for performing a radio resource control (RRC) connection or reestablishment in a communication system using carrier aggregation (CA), and to a terminal device for same. The present invention involves acquiring information on an additional component carrier (CC) through system information in addition to the CC which is specified during cell selection or reselection, and enables the CC on which additional information is acquired to be usable during the RRC connection or reestablishment performed by user equipment, to thereby prevent loads from being concentrated on a specific CC.

13 Claims, 8 Drawing Sheets

METHOD FOR PERFORMING RRC CONNECTION OR REESTABLISHMENT IN A COMMUNICATION SYSTEM USING CARRIER AGGREGATION

CROSS-REFERENCE TO RELATED APPLICATIONS

This application is the National Stage filing under 35 U.S.C. 371 of International Application No. PCT/KR2010/002335, filed on Apr. 15, 2010, which claims the benefit of earlier filing date and right of priority to Korean Application No. 10-2010-0033274, filed on Apr. 12, 2010, and also claims the benefit of U.S. Provisional Application Ser. No. 61/171,440, filed on Apr. 21, 2009.

TECHNICAL FIELD

The present invention relates to a method for establishing or reestablishing a Radio Resource Control (RRC) connection in a communication system using Carrier Aggregation (CA) and a User Equipment (UE) for performing the method.

BACKGROUND ART

Long Term Evolution (LTE) is an evolution of Universal Mobile Telecommunications System (UMTS), standardized by an international standardization body, 3$^{rd}$ Generation Partnership Project (3GPP). The configuration of an LTE system is illustrated in FIG. 1.

Figure 1:
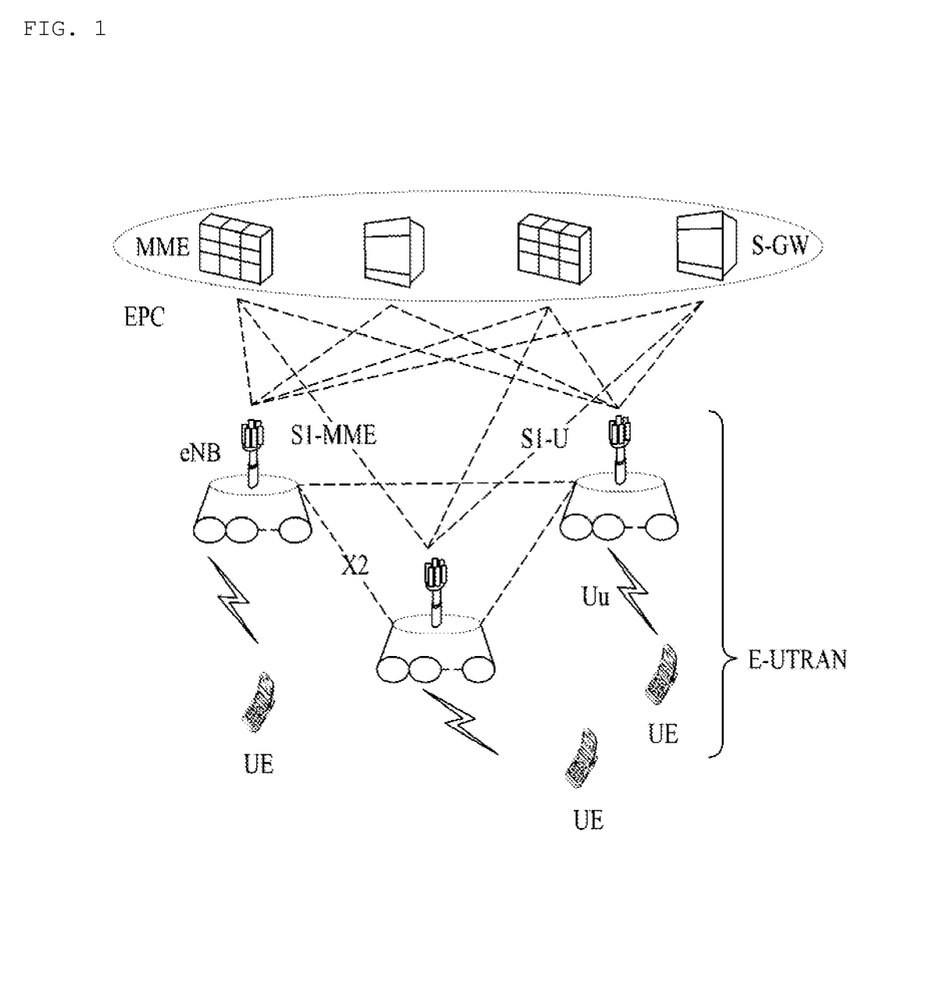
FIG. 1 is a view referred to for describing the configuration of a Long Term Evolution (LTE) system.

FIG. 1 is a view referred to for describing the configuration of an LTE system.

The LTE system may be divided largely into an Evolved UMTS Terrestrial Radio Access Network (E-UTRAN) and an Evolved Packet Core (EPC). The E-UTRAN includes UEs and evolved Node Bs (eNBs). A UE is connected to an eNB via a Uu interface and one eNB is connected to another eNB via an X2 interface. The EPC includes a Mobility Management Entity (MME) responsible for control-plane (C-plane) functions and a Serving GateWay (S-GW) responsible for user-plane (U-plane) functions. An eNB is connected to the MME via an S1-MME interface and an eNB is connected to the S-GW via an S1-U interface. These two interfaces are collectively called an S1 interface.

For the Uu interface being an air interface, a radio interface protocol stack is defined. The radio interface protocol stack horizontally includes a PHYsical (PHY) layer, a data link layer, and a network layer and vertically includes a U-plane for user data transmission and a C-plane for control signaling. Based on the lowest three layers of the Open System Interconnection (OSI) reference model known in communication systems, this radio protocol stack can be divided into Layer 1 (L1) including a PHY layer, Layer 2 (L2) including a Medium Access Control/Radio Link Control/Packet Data Convergence Protocol (MAC/RLC/PDCP) layer, and Layer 3 (L3) including a Radio Resource Control (RRC) layer. These layers are defined in pairs between a UE and an Evolved UTRAN (E-UTRAN), for data transmission via the Uu interface.

Now a description will be given below of a Long Term Evolution Advanced (LTE-A) system.

LTE-A is a system developed from LTE to meet the 4$^{th}$ Generation (4G) mobile communication requirements, that is, IMT-Advanced requirements recommended by the International Telecommunication Union-Radio communication sector (ITU-R). The 3GPP which developed the LTE system standard is now actively working on standardization of the LTE-A system.

Major technologies added to the LTE-A system are carrier aggregation for extending a used bandwidth and flexibly using the bandwidth and use of relays for supporting group mobility and enabling user-centered network deployment.

Figure 2:
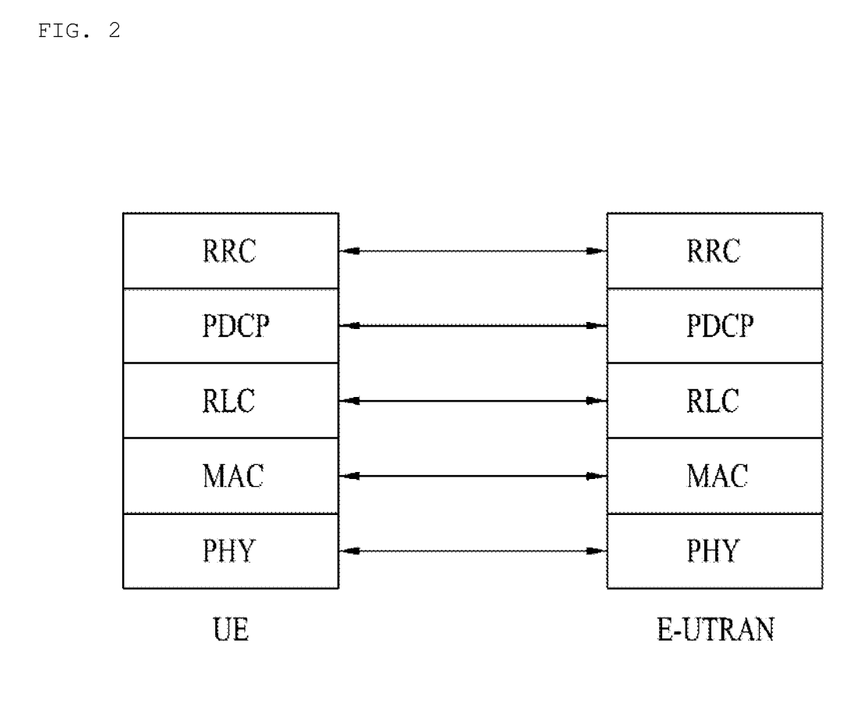
FIGS. 2 and 3 illustrate radio protocol layers.
Figure 3:
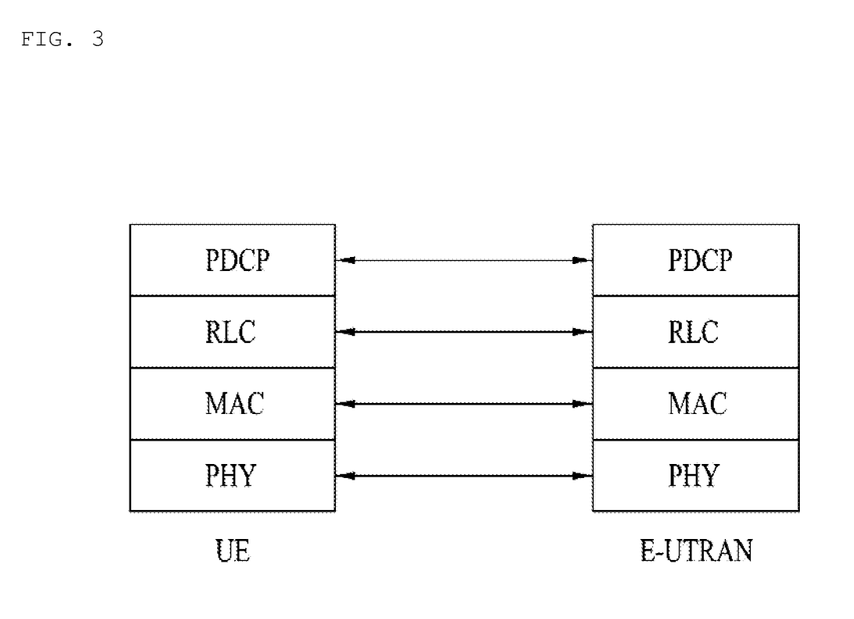

FIGS. 2 and 3 are views referred to for describing radio protocol layers.

At L1, the PHY layer provides information transfer service to its higher layer on physical channels. The PHY layer is connected to the MAC layer through transport channels and data is transferred between the MAC layer and the PHY layer on the transport channels. The transport channels are largely divided into dedicated transport channels and common transport channels depending on whether the transport channels are shared or not. Data is transmitted on physical channels using radio resources between different PHY layers, that is, the PHY layers of a transmitter and a receiver.

There are a plurality of layers at L2. The MAC layer maps logical channels to transport channels and performs logical channel multiplexing by mapping a plurality of logical channels to one transport channel. The MAC layer is connected to its higher layer, the RLC layer through logical channels. Depending on the types of information carried on the logical channels, the logical channels are classified into control channels that deliver C-plane information and traffic channels that deliver U-plane information.

The RLC layer at L2 adjusts a data size to be suitable for data transmission in the air interface from a lower layer by segmenting and concatenating data received from a higher layer. In order to guarantee various Quality of Service (QoS) requirements of each Radio Bearer (RB), the RLC layer provides three operation modes, Transparent Mode (TM), Unacknowledged Mode (UM), and Acknowledged Mode (AM). Especially, an AM RLC performs a retransmission function through ARQ, for reliable data transmission.

The PDCP layer at L2 compresses a header to reduce the size of an Internet Protocol (IP) packet header of a relatively large size containing unnecessary control information to efficiently transmit an IP packet such as an IPv4 or IPv6 packet via a radio link having a narrow bandwidth. The header compression function enables transmission of necessary information in a header only, thereby increasing the transmission efficiency of a radio link. In addition, the PDCH layer performs a security function in the LTE system. This security function involves ciphering for preventing a third part from eavesdropping and integrity protection for preventing a third party from maliciously modifying data.

The RRC layer at the highest of L3 is defined only on the C-plane. The RRC layer takes charge of controlling logical channels, transport channels, and physical channels in relation to configuration, reconfiguration, and release of RBs. An RB is a logical path provided by L1 and L2 in the radio protocol architecture, for data transmission between a UE and a UTRAN. In general, configuring an RB means defining the features of a radio protocol layer and channels needed to provide a specific service and setting specific parameters and an operation scheme. RBs are classified into Signaling RB (SRB) and Data RB (DRB). The SRB is used as a path in which an RRC message is transmitted on the C-plane and the DRB is used as a path in which user data is transmitted on the U-plane.

Now, a description will be given of RRC_IDLE state of a UE. In the RRC_IDLE state, the UE should always select a cell having a suitable quality and prepare for receiving a service from the selected sell. For example, upon power-on, the UE should select a cell having a suitable quality to register to a network. If the UE transitions from RRC_CONNECTED to the RRC_IDLE state, it should select a cell to camp on. The process of selecting a cell satisfying a specific condition to stay in a service idle state such as the RRC_IDLE state is called cell selection.

How a UE selects a cell will be described in detail. Upon initial power-on, the UE searches available Public Land Mobile Networks (PLMNs) and selects a suitable PLMN from which to receive a service. Subsequently, the UE selects a cell having a signal quality and characteristics good enough to provide a service to the UE. Cell selection is largely divided into two processes. One is initial cell selection. During initial cell selection, the UE has no prior knowledge of radio channels. Therefore, the UE scans all radio channels to search for a suitable cell. Once the UE detects a suitable cell satisfying a cell selection criterion, it selects the detected cell. The other cell selection process is cell selection. During cell selection, the UE selects a cell based on stored information about radio channels or information broadcast from cells. Accordingly, cell selection can be faster than during initial cell selection. Once the UE detects a cell satisfying the cell selection criterion, it selects the detected cell. If the UE fails to detect a suitable cell satisfying the cell selection criterion, it performs initial cell selection.

How a UE reselects a cell will be described below. After the UE selects a cell through cell selection, signal strength or quality between the UE and an eNB may change due to a change in the mobility of the UE or a change in radio environment. If the quality of the selected cell is degraded, the UE may select another cell offering a better quality. When reselecting a cell in this manner, the UE generally selects a cell having a better signal quality than the current cell. This process is called cell reselection. The basic purpose of cell reselection lies in selection of a cell having the best quality. Aside from the aspect of radio signal quality, the network may prioritize frequencies and notify the UE of the priority levels of the frequencies. Then, the UE puts the priority levels of frequencies before the qualities of radio signals during cell reselection.

Now a description will be given of CA in the LTE-A system.

Figure 4:
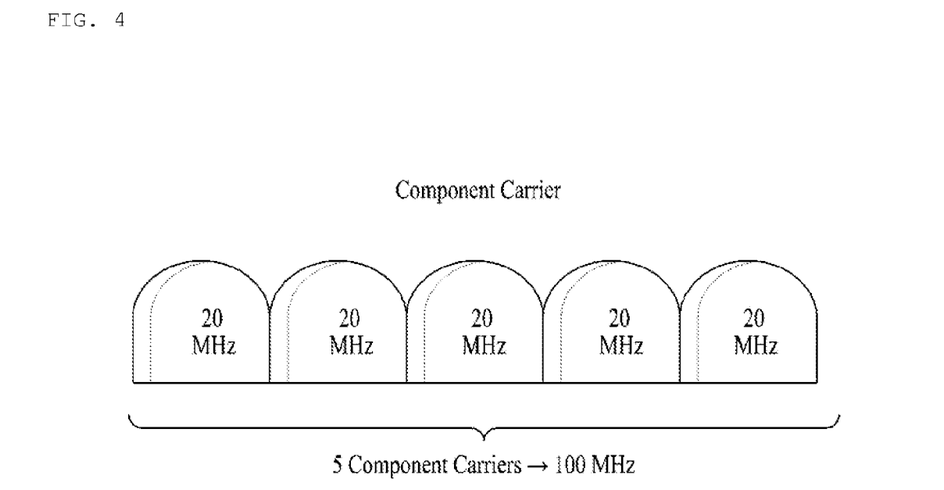
FIG. 4 is a view referred to for describing Carrier Aggregation (CA)

FIG. 4 is a view referred to for describing CA.

As described above, the LTE-A standard is designed as an IMT-Advanced candidate technology of the ITU to satisfy IMT-Advanced technical requirements. Accordingly, extension of a bandwidth from the legacy LTE system is under discussion to satisfy IMT-Advanced technical requirements. For bandwidth extension, carriers available to the legacy LTE system are defined as Component Carriers (CCs) in the LTE-A system. Aggregation of up to 5 CCs is under discussion, as illustrated in FIG. 4. Because a CC may occupy up to 20 MHz as in the LTE system, the CA technology of the LTE-A standard is a concept of extending a bandwidth to up to 100 MHz. The technology of aggregating a plurality of CCs is called CA.

DISCLOSURE

Technical Problem

To implement CA, a plurality of CCs should be deployed in the same area. Thus, a UE in RRC_IDLE state should measure the signal qualities of more CCs during cell selection and cell reselection, which may affect the battery consumption of the UE. In this context, a service provider may set that even though a plurality of CCs are configured for CA, a UE selects only specific CCs from among the plurality of CCs during cell selection and cell reselection.

In this case, however, all UEs in the area select the specific DL CCs during cell selection and cell reselection and establish an RRC connection using the DL CCs and associated UL CCs, thereby concentrating load on the DL CCs and UL CCs.

Technical Solution

In an aspect of the present invention, a method for establishing or reestablishing a Radio Resource Control (RRC) connection to a network at a User Equipment (UE) in a mobile communication system using Carrier Aggregation (CA) in which communication is conducted on a plurality of Component Carriers (CCs), includes performing cell selection or cell reselection; selecting a first downlink CC according to a result of the cell selection or cell reselection; selecting a first uplink CC linked to the first downlink CC; receiving system information on the first downlink CC from the network, the system information including information about a second uplink CC and a second downlink CC; selecting one of a first CC set having the first uplink CC and the first downlink CC and a second CC set having the second uplink CC and the second downlink CC; and establishing or reestablishing an RRC connection to the network using the selected CC set.

During the CC set selection, the UE may select one of the first CC set and the second CC set, randomly or taking into account at least one of per-CC load information and per-CC channel quality information.

If the first CC is included in an available CC set for the UE before the CC set selection and the second CC is selected during the CC set selection, the UE may include the second CC set in the available CC set.

If the second CC is selected during the CC set selection, the RRC connection establishment or reestablishment may include transmitting a random access preamble on the second uplink CC to the network; receiving a response message for the random access preamble on the second downlink CC from the network; transmitting an RRC connection request message or an RRC reconnection request message on the second uplink CC to the network; and receiving a response message for the RRC connection request message or the RRC reconnection request message on the second downlink CC from the network.

If the response message for the RRC connection request message or the RRC reconnection request message is received on the second downlink CC from the network, the UE may further delete the first CC set from the available CC set. If the response message for the RRC connection request message or the RRC reconnection request message is received on the second downlink CC from the network, the UE may further transmit information about the available CC set to the network.

In another aspect of the present invention, a UE for establishing or reestablishing an RRC connection to a network in a mobile communication system using CA in which communication is conducted on a plurality of CCs includes an RRC layer module for generating a logical channel signal for RRC connection establishment or reestablishment; a Medium Access Control (MAC) layer module including a plurality of Hybrid Automatic Repeat reQuest (HARQ) entities one to one corresponding to the plurality of CCs, for mapping the logical channel signal for RRC connection establishment or reestablishment to a transport channel and controlling transmission of the transport channel on one of the plurality of CCs; and a physical layer module for mapping the transport channel to a physical channel and controlling transmission of the physical channel on the one CC. If system information is received from the network on a first downlink CC between a first uplink CC and the first downlink CC selected according to cell selection or cell reselection of the RRC layer module, the system information including information about a second uplink CC and a second downlink CC, the MAC layer module selects one of a first CC set having the first uplink CC and the first downlink CC and a second CC set having the second uplink CC and the second downlink CC, and establishes or reestablishes an RRC connection to the network using the selected CC set.

The MAC layer module may select one of the first CC set and the second CC set, randomly or taking into account at least one of per-CC load information and per-CC channel quality information.

The UE may further include a storage medium for storing an available CC set for the UE.

If the first CC is included in an available CC set for the UE before the MAC layer module selects the one of the first CC set and the second CC set and the MAC layer module selects the second CC to transmit the logical channel signal for RRC connection establishment or reestablishment, the storage medium may include the second CC set in the available CC set.

If the MAC layer module establishes or reestablishes the RRC connection using the second CC set, the MAC layer module may delete the first CC set from the available CC set. If the MAC layer module establishes or reestablishes the RRC connection using the second CC set, the MAC layer module may transmit information about the available CC set to the network.

Advantageous Effects

As described above, as a UE uses CCs that are not included in its CC set in an RRC connection establishment or reestablishment procedure and manages the CC set accordingly, a load problem may be prevented, which might otherwise result from concentration of RRC connection establishments or reestablishments on a specific CC.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to one of $3^{rd}$ Generation partnership Project (3GPP) Long Term Evolution (LTE) series of standards is being used. However, the description is applicable to any other mobile communication system except for specific features inherent to the 3GPP LTE series of standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), etc. In addition, the term Base Station (BS) generically refers to any node at a network end which communicates with a UE, such as a Node B, an eNode B, etc.

Hereinbelow, a random access procedure performed in the LTE system and a case where a Radio Resource Control (RRC) connection establishment or reestablishment procedure including the random access procedure in a system to which Carrier Aggregation (CA) is applied will be described in great detail.

In the LTE system, a UE may perform the random access procedure,
 when the UE initially accesses an eNB without an RRC connection established between them,
 when the UE initially accesses a target cell during handover,
 when the random access procedure is requested by a command from the eNB,
 upon generation of uplink data in a situation where uplink time synchronization has not been acquired or specified radio resources for use in requesting radio resources have not been allocated, or
 when a radio link failure or a handover failure is recovered.

Based on the above description, a general random access procedure will be described below.

Figure 5:
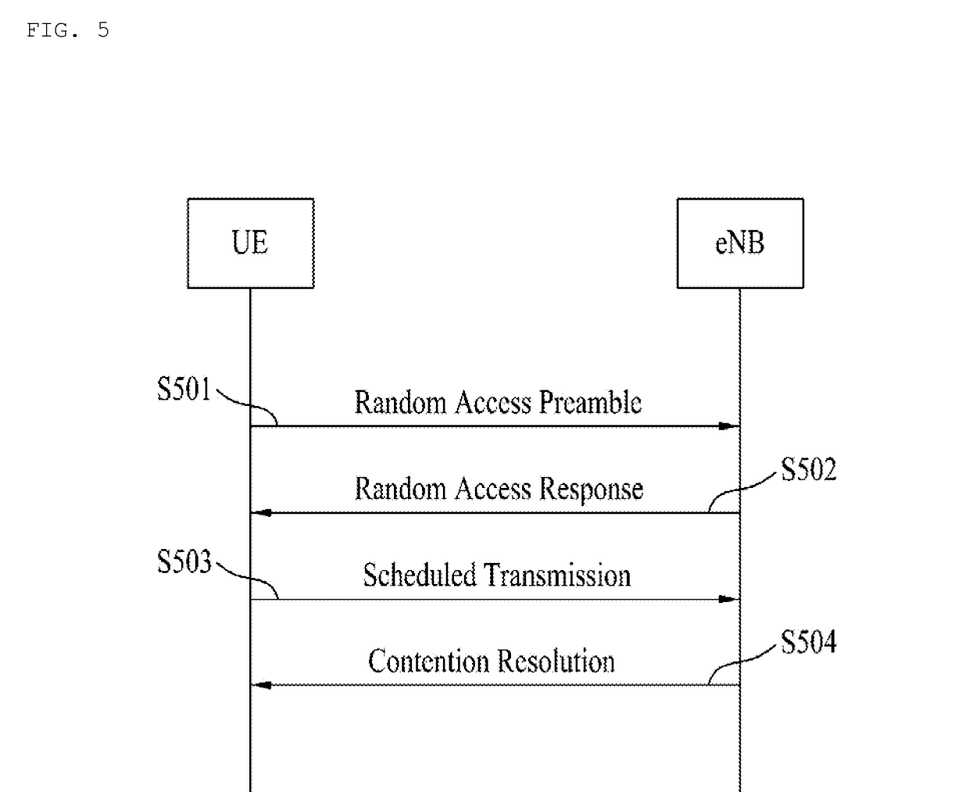
FIG. 5 is a diagram illustrating a signal flow for operations of a User Equipment (UE) and an evolved Node B (eNB) in a contention-based random access procedure.

FIG. 5 is a diagram illustrating a signal flow for operations of a UE and an eNB in a contention-based random access procedure.

(1) Transmission of First Message

The UE may select a random access preamble randomly from a random preamble set indicated by system information or a Handover Command, select Physical Random Access CHannel (PRACH) resources, and transmit the random access preamble in the PRACH resources (S501).

(2) Reception of Second Message

After transmitting the random access preamble in step S501, the UE attempts to receive a random access response within a random access response reception window indicated through the system information or the Handover Command by the eNB (S502). To be more specific, the random access response may be transmitted in the form of a Medium Access Control Protocol Data Unit (MAC PDU) and the MAC PDU may be delivered on a Physical Downlink Shared CHannel (PDSCH). To receive information on the PDSCH successfully, the UE preferably monitors a Physical Downlink Control CHannel (PDCCH). That is, the PDCCH preferably carries information about a UE to receive the PDSCH, information about the frequency and time of radio resources of the PDSCH, and information about the transmission format of the PDSCH. Once the UE succeeds in receiving the PDCCH destined for it, the UE may successfully receive a random access response on the PDSCH according to information carried on the PDCCH. The random access response may include an Identifier (ID) of the random access preamble (e.g. a Random Access Preamble ID (RAPID)), an Uplink (UL) Grant indicating uplink resources, a temporary Cell-Radio Network Temporary Identify (C-RNTI), and a Timing Advance Command (TAC).

The reason for including the RAPID in the random access response is that because one random access response may contain random access response information for one or more UEs, it is necessary to indicate a UE to which the UL Grant, the temporary C-RNTI, and the TAC are valid. It is assumed in step S502 that the ID of the random access preamble is identical to the RAPID included in the random access response. Thus, the UE may receive the UL Grant, the temporary C-RNTI, and the TAC.

(3) Transmission of Third Message

Upon receipt of a valid random access response, the UE processes information included in the random access response. That is, the UE applies the RAC and stores the temporary C-RNTI. In addition, the UE may store data to be transmitted in a message3 buffer in correspondence with the reception of the valid random access response.

Meanwhile, the UE transmits data (i.e. a third message) to the eNB using the received UL Grant (S503). The third message should include an ID of the UE. In the contention-based random access procedure, the eNB cannot identify UEs that perform the random access procedure. However, the eNB should identify the UEs to avoid later-collision among them.

Two methods have been discussed to include the ID of the UE in the third message. One of the methods is that if the UE has a valid C-RNTI allocated by the cell before the random access procedure, the UE transmits its C-RNTI in an uplink signal corresponding to the UL Grant. On the other hand, if the valid C-RNTI has not been allocated to the UE before the random access procedure, the UE transmits its UE ID (e.g. SAE-Temporary Mobile Subscriber Identify (S-TMSI) or a random ID) in data. In general, the UE ID is longer than the C-RNTI. If the UE transmits data corresponding to the UL Grant, the UE activates a Contention Resolution (CR) timer to avoid contention.

(4) Reception of Fourth Message

After transmitting its ID in data according to the UL Grant included in the random access response, the UE awaits reception of a command for contention resolution from the eNB. That is, the UE attempts to receive a PDCCH in order to receive a specific message (S504). For PDCCH reception, two methods may be considered. When the third message is transmitted using the C-RNTI according to the UL Grant as described above, the UE attempts to receive a PDCCH using the C-RNTI. If the ID included in the third message is the UE ID, the UE may attempt to receive a PDCCH using the temporary C-RNTI included in the random access preamble. In the former case, if the UE receives a PDCCH using the C-RNTI before expiration of the CR timer, the UE ends the random access procedure, determining that the random access procedure has been performed normally. In the latter case, if the UE receives a PDCCH using the temporary C-RNTI before expiration of the CR timer, the UE checks data received on a PDSCH indicated by the PDCCH. If the data includes its UE ID, the UE ends the random access procedure, determining that the random access procedure has been performed normally.

Based on the above description, operations of the UE and the eNB when CA starts will be described below.

The UE and the eNB may perform the following operation to start CA.

1. In RRC_IDLE state, the UE may select one DL CC during cell selection and cell reselection.

2. The UE may acquire system information from the eNB on the selected DL CC.

3. The UE determines UL CC information (information about the frequency and bandwidth of a UL CC) from the system information. Accordingly, the UE may include the DL CC and UL CC in a CC set according to the system information.

4. The UE may perform an RRC connection establishment or reestablishment procedure through the CCs (the UL CC and the DL CC).

5. After completing the RRC connection establishment or reestablishment procedure, the UE may transmit CA-related capability information to the eNB. The capability information may specify the maximum number of CCs on which the UE can transmit or receive data to or from the eNB.

6. The eNB may configure an additional DL CC or UL CC for the UE based on the capability information, when needed. In this case, the UE may add the additional DL CC or UL CC to the CC set.

7. Subsequently, the UE may transmit or receive data to or from the eNB on a CC included in the CC set.

However, since a plurality of CCs are deployed in the same area to implement CA, a UE in RRC_IDLE state should measure the signal qualities of more CCs during cell selection and cell reselection, which may affect the battery consumption of the UE. In this context, a service provider may set that even though a plurality of CCs are configured for CA, a UE selects only specific CCs from among the plurality of CCs during cell selection and cell reselection.

In this case, however, all UEs in the area select the specific DL CCs during cell selection and cell reselection and establish an RRC connection using the DL CCs and associated UL CCs, thereby concentrating load on the DL CCs and UL CCs.

For example, it is assumed that a specific eNB configures three DL CCs and three UL CCs for CA, DL CC1 is linked to UL CC1, DL CC2 to UL CC2, and DL CC3 to UL CC3 according to system information, and only DL CC1 is available to a UE during cell selection and reselection.

Because all UEs in the area cannot help selecting only DL CC1 for RRC selection or reselection, the UEs should use DL CC1 and UL CC1 during RRC connection establishment or reestablishment. Consequently, load is concentrated on the CC.

Accordingly, an embodiment of the present invention proposes that a UE performs an RRC connection establishment or reestablishment procedure using a CC selected between a CC pre-selected during cell selection or reselection and an additional CC indicated by additional CC information acquired from system information.

Figure 6:
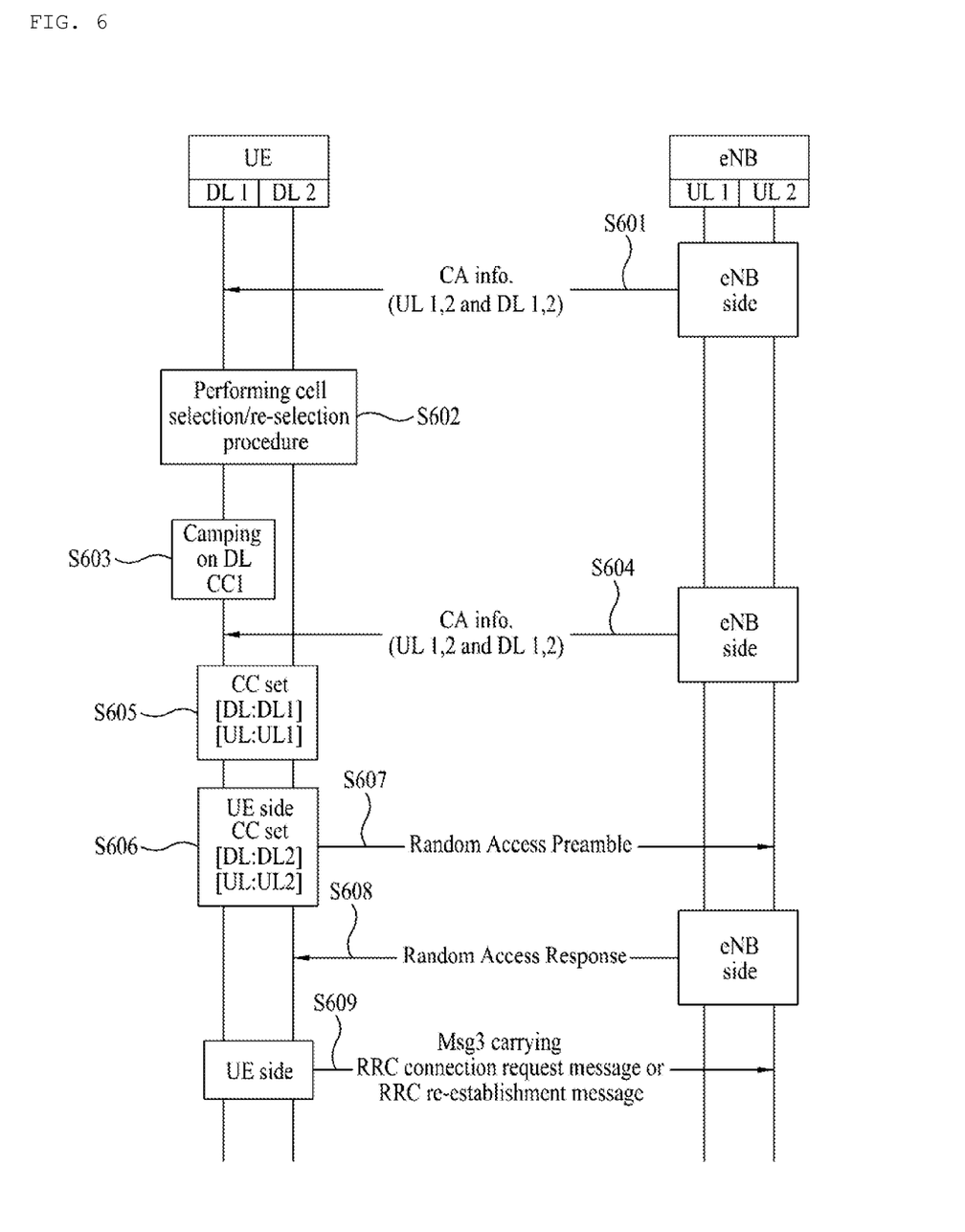
FIG. 6 is a view referred to for describing a method for establishing/reestablishing a Radio Resource Control (RRC) connection at the UE according to an embodiment of the present invention.

FIG. 6 is a view referred to for describing a method for establishing/reestablishing a Radio Resource Control (RRC) connection at the UE according to an embodiment of the present invention.

Step S601: The eNB may transmit information about CCs used for CA to the UE in system information or an RRC signal. For example, the eNB is shown in FIG. 6 as transmitting information about DL CC1 and UL CC1 and information about DL CC2 and UL CC2 to the UE. The information about the CCs refers to information required for the UE to transmit or receive data on the CCs. In addition, the information about the CCs may include information required for the UE to perform the random access procedure through the CCs.

Step S602: Subsequently, the UE may perform a cell selection and reselection procedure for various reasons. For example, upon receipt of an RRC connection release command from the eNB or upon occurrence of a Radio Link Failure (RLF), the UE may perform the cell selection and reselection procedure.

Step S603: The UE may select a specific DL CC in the cell selection and reselection procedure. It is because a service provider may preset a specific CC to decrease the number of CCs that the UE should monitor during cell selection or cell reselection, as described before. In the illustrated case of FIG. 6, it is assumed that the UE has selected DL CC1. Therefore, the UE may include DL CC1 in its CC set. The UE may decide on a UL CC based on system information received on DL CC1. It is assumed that the UE subsequently adds UL CC1 to its CC set.

Step S604: The UE may receive information about CCs for CA in system information from the eNB. In FIG. 6, information about DL CC2 and UL CC2 is acquired from the eNB.

Step S605: It is assumed here that DL CC2 and UL CC2 are not included in the CC set of the UE. The UE is assumed to have information indicating that DL CC2 is linked to UL CC2.

Step S606: The UE should perform a random access procedure to establish or reestablish an RRC connection. DL CC2 and UL CC2 as well as DL CC1 and UL CC1 included in the CC set after the cell selection or reselection may be available to the UE in the random access procedure according to the embodiment of the present invention. That is, the UE may select between the additional DL/UL CC2 and DL/UL CC1 selected preliminarily during cell selection or reselection for use in the random access procedure. It is assumed in FIG. 6 that the UE selects DL CC2 and UL CC2 to establish or reestablish an RRC connection.

Steps S607, S608, and S609: After selecting DL CC2 and UL CC2 to establish or reestablish an RRC connection, the UE may perform the random access procedure described before with reference to FIG. 5 using DL CC2 and UL CC2. That is, the UE may transmit a random access preamble to the eNB (S607), may receive a random access response message in response to the random access preamble (S608), and may transmit a transport channel carrying CCCH information for an RRC connection request or RRC reconnection request to the eNB using a UL grant received in the random access response message (S609). Then, upon receipt of a UL Grant from the eNB, the UE may end the random access procedure successfully.

During the CC selection of step S606, the UE may select one of CC1 and CC2 randomly or according to a specific condition in the embodiment of the present invention. In the former case, the UE randomly selects one of CCs included and CCs not included in its CC set through cell selection or reselection. In the latter case, the eNB sets CCs to be distinguished from each other according to their qualities or load states and the UE selects the best-quality CC or the lowest-load CC from among the CCs.

In accordance with the embodiment of the present invention, the UE may use an additional CC for RRC connection establishment/reestablishment after cell selection/reselection according to CC information acquired from system information received after the cell selection/reselection and may add the additional CC to its available CC set. In FIG. 6, the UE adds DL CC2 and UL CC2 to its available CC set in step S606. Notably, the UE may add the DL CC and UL CC to the CC set after it succeeds in establishing or reestablishing an RRC connection.

If the UE selects the additional CCs during CC selection and uses them in the RRC connection establishment or reestablishment procedure, the eNB is not aware of the DL CC pre-selected during the cell selection and reselection and the UL CC linked to the DL CC. Thus, the UE and the eNB may manage the CC set as follows.

(1) After establishing or reestablishing an RRC connection, the UE may delete CCs other than the DL CC and UL CC selected during the CC selection and used for the RRC connection establishment or reestablishment from the available CC set. This is done to prevent confusion involved in using any other CC later because the eNB knows only information about the CCs that the UE used for establishing or reestablishing the RRC connection in the random access procedure.

(2) In another method, the UE may transmit information about the available CC set to the eNB after establishing or reestablishing the RRC connection, in order to notify the eNB of CCs other than the DL CC and UL CC selected through the CC selection and used for the RRC connection establishment or reestablishment. For example, if the UE selects DL CC1 and UL CC1 during cell selection and reselection and determines to use DL CC2 and UL CC2 through CC selection in the RRC connection establishment or reestablishment procedure, the UE notifies the eNB that its CC set includes DL CC1, DL CC2, UL CC1, and UL CC2.

According to the embodiment of the present invention, the UE can select an additional CC in an RRC connection establishment or reestablishment procedure, thereby preventing load from concentrating on a specific CC as described before.

Now, a description will be given of a UE apparatus and an eNB apparatus for establishing/reestablishing an RRC connection as described above.

The UE apparatus and the eNB apparatus include an antenna, a processor, etc. according to their device types. The following is given, focusing on the structure of a processor for controlling the above-described operations.

The processors of the UE and the eNB may have the layer structures illustrated in FIGS. 2 and 3. In each embodiment of the present invention, the processors of the UE and the eNB have the following structures for use in a system to which CA is applied.

Figure 7:
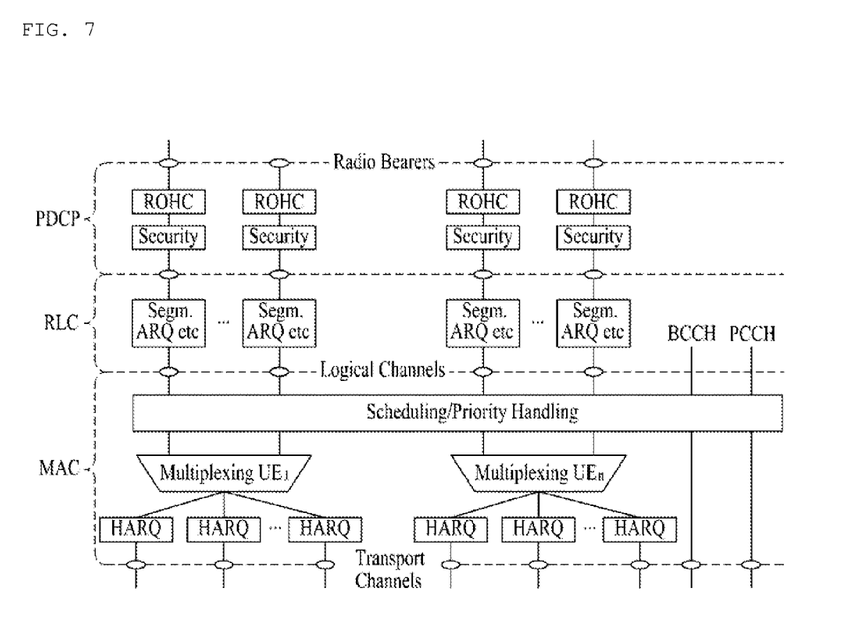
FIGS. 7 and 8 illustrate the structure of a processor at the UE according to an embodiment of the present invention.
Figure 8:
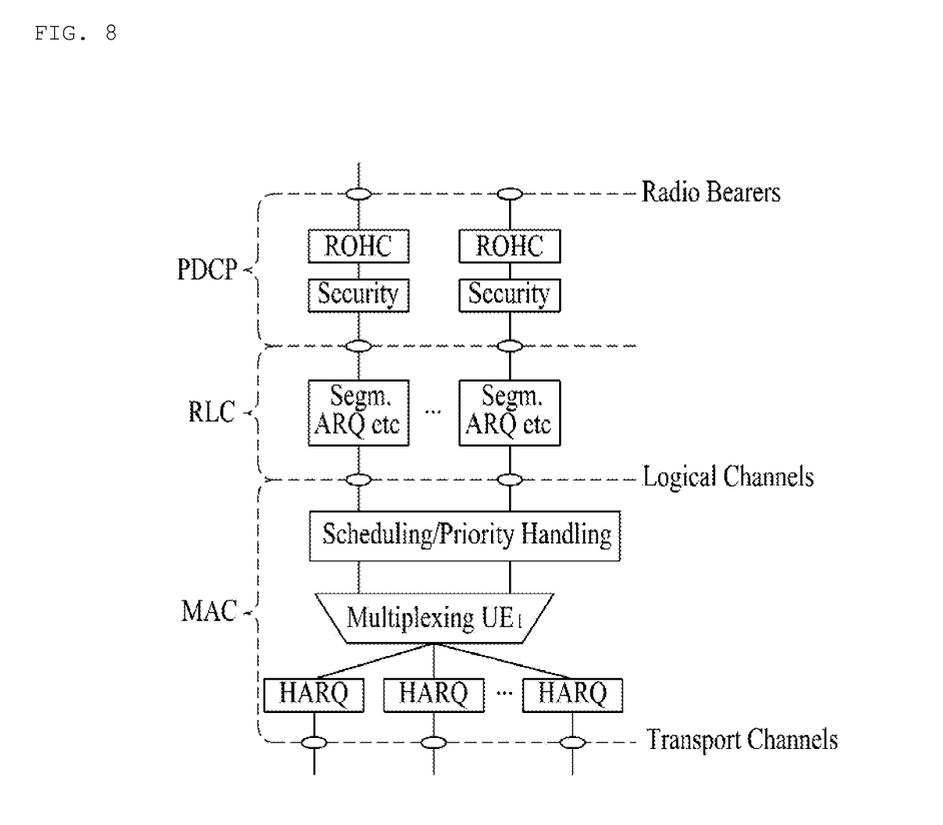

FIGS. 7 and 8 illustrate the structure of a processor at the UE according to an embodiment of the present invention.

Specifically, FIG. 7 illustrates the downlink L2 structure of the eNB for performing the afore-described method, and FIG. 8 illustrates the uplink L2 structure of the UE for performing the afore-described method.

The CA technology significantly affects the MAC layer at L2. For example, a system using CA uses a plurality of CCs and each HARQ entity manages one CC. Therefore, the MAC layers of the UE processor and the eNB processor should perform operations related to a plurality of HARQ entities in the embodiment of the present invention. In addition, since each HARQ entity processes a transport block, a plurality of transport blocks can be transmitted or received at the same time on a plurality of CCs in CA.

That is, MAC layer modules of the UE and the eNB include a plurality of HARQ entities, each taking charge of a CC in the embodiment of the present invention. As illustrated in FIG. 7, the MAC layer module of the eNB processor may include a multiplexing module for multiplexing a plurality of HARQ entities 1:1 corresponding to a plurality of CCs for each UE (e.g. UE1 or UE2) and a module for scheduling/priority handling for all UEs. As illustrated in FIG. 8, the MAC layer module of the UE may also include a multiplexing module for multiplexing a plurality of HARQ entities 1:1 corresponding to a plurality of CCs and a module for scheduling/priority handling for uplink resources.

The UE apparatus having the above L2 structure will be described in greater detail, from the viewpoint of the afore-described RRC connection establishment/reestablishment.

The UE processor includes an RRC layer module for generating a logical channel signal for RRC connection establishment or reestablishment. For example, an RRC connection request message may be mapped to a CCCH and transmitted to the later-described MAC layer.

The MAC layer module may map the logical channel signal (e.g. the CCCH) for RRC connection establishment/reestablishment to a MAC PDU format and transmit the mapped logical channel signal to the physical layer on a transport channel. The transport channel may be transmitted using any of a plurality of HARQ entities. A physical layer module may map the transport channel signal to a physical channel (e.g. a PDSCH) and transmit the PDSCH to the eNB. In case of the above-described signal for RRC connection establishment/reestablishment, it may be transmitted to the eNB as a third message transmitted in a random access procedure. Meanwhile, first and second messages may be transmitted according to decision of the physical layer irrespective of HARQ entities in the random access procedure.

If the MAC layer module of the UE processor receives from the eNB information about additional CCs (e.g. DL CC2 and UL CC2) on DL CC1 selected between specific CCs (e.g. DL CC1 and UL CC1) selected during cell selection or cell reselection of the RRC layer module, it may select one of a CC combination of DL CC1 and UL CC1 and a CC combination of DL CC2 and UL CC2 and perform the RRC connection establishment/reestablishment procedure using the selected CC combination. The CC selection process may correspond to, but not limited to, selection of a matching HARQ entity from the viewpoint of the UE apparatus.

The CC combination may be selected randomly or taking into account a per-CC channel state and/or a per-CC load state.

In accordance with the embodiment of the present invention, the UE may further include a storage medium for storing its available CC set. The UE may store CCs selected during cell selection/reselection (e.g. DL CC1 and UL CC1). If the UE uses additional CCs (e.g. DL CC2 and UL CC2) for RRC connection establishment/reestablishment, it may store the additional CCs in the storage medium.

After the RRC connection establishment/reestablishment, the UE may notify the eNB of the CC set stored in the storage medium or may delete the remaining CCs except for the CCs used for the RRC connection establishment/reestablishment from the storage medium.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Industrial Applicability

As described above, the present invention can be used in a variety of mobile communication systems.

The invention claimed is:

1. A method for establishing or reestablishing a Radio Resource Control (RRC) connection to a network at a User Equipment (UE) in a mobile communication system using Carrier Aggregation (CA) in which communication is conducted on a plurality of Component Carriers (CCs), the method comprising:
    performing cell selection or cell reselection;
    selecting a first downlink CC according to a result of the cell selection or the cell reselection, wherein the first downlink CC is selected among an available CC set for the UE;
    selecting a first uplink CC linked to the first downlink CC, wherein the first uplink CC is selected among the available CC set for the UE;
    receiving system information on the first downlink CC from the network after performing the cell selection or the cell reselection, the system information including information about a second uplink CC and a second downlink CC;
    adding the second uplink CC and the second downlink CC to the available CC set for the UE;
    selecting a first CC set having the first uplink CC and the first downlink CC or a second CC set having the second uplink CC and the second downlink CC; and
    establishing or reestablishing an RRC connection to the network using the selected CC set.

2. The method according to claim 1, wherein selecting the first CC set or the second CC set comprises randomly selecting the first CC set or the second CC set.

3. The method according to claim 1, wherein selecting the first CC set or the second CC set comprises selecting the first CC set or the second CC set, taking into account at least per-CC load information or per-CC channel quality information.

4. The method according to claim 1, wherein if the second CC set is selected during the CC set selection, establishing or reestablishing the RRC connection comprises:
    transmitting a random access preamble on the second uplink CC to the network;
    receiving a response message for the random access preamble on the second downlink CC from the network;
    transmitting an RRC connection request message or an RRC reconnection request message on the second uplink CC to the network; and
    receiving a response message for the RRC connection request message or the RRC reconnection request message on the second downlink CC from the network.

5. The method according to claim 4, further comprising, if the response message for the RRC connection request message or the RRC reconnection request message is received on the second downlink CC from the network, deleting the first CC set from the available CC set.

6. The method according to claim 4, further comprising, if the response message for the RRC connection request message or the RRC reconnection request message is received on the second downlink CC from the network, transmitting information about the available CC set to the network.

7. A User Equipment (UE) for establishing or reestablishing a Radio Resource Control (RRC) connection to a network in a mobile communication system using Carrier Aggregation (CA) in which communication is conducted on a plurality of Component Carriers (CCs), the UE comprising:
    an RRC layer module for generating a logical channel signal for RRC connection establishment or reestablishment;

a Medium Access Control (MAC) layer module including a plurality of Hybrid Automatic Repeat reQuest (HARM) entities one to one corresponding to the plurality of CCs, for mapping the logical channel signal for RRC connection establishment or reestablishment to a transport channel and controlling transmission of the transport channel on one of the plurality of CCs; and a physical layer module for mapping the transport channel to a physical channel and controlling transmission of the physical channel on the one of the plurality of CCs, wherein if system information is received from the network on a first downlink CC between a first uplink CC and the first downlink CC selected among an available CC set for the UE according to cell selection or cell reselection of the RRC layer module, the system information including information about a second uplink CC and a second downlink CC, the second uplink CC and the second downlink CC are added to the available CC set for the UE, and the MAC layer module selects a first CC set having the first uplink CC and the first downlink CC or a second CC set having the second uplink CC and the second downlink CC, and establishes or reestablishes an RRC connection to the network using the selected CC set.

8. The UE according to claim 7, wherein the MAC layer module randomly selects the first CC set or the second CC set.

9. The UE according to claim 7, wherein the MAC layer module selects the first CC set or the second CC set, taking into account at least per-CC load information or per-CC channel quality information.

10. The UE according to claim 7, further comprising a storage medium for storing the available CC set for the UE.

11. The UE according to claim 10, wherein the MAC layer module selects the second CC set to transmit the logical channel signal for RRC connection establishment or reestablishment, and the storage medium includes the second CC set in the available CC set.

12. The UE according to claim 11, wherein if the MAC layer module establishes or reestablishes the RRC connection using the second CC set, the MAC layer module deletes the first CC set from the available CC set.

13. The UE according to claim 11, wherein if the MAC layer module establishes or reestablishes the RRC connection using the second CC set, the MAC layer module transmits information about the available CC set to the network.

* * * * *